United States Patent [19]

Nadir et al.

[11] Patent Number: 5,479,641
[45] Date of Patent: Dec. 26, 1995

[54] METHOD AND APPARATUS FOR OVERLAPPED TIMING OF CACHE OPERATIONS INCLUDING READING AND WRITING WITH PARITY CHECKING

[75] Inventors: James Nadir; Ching-Hua Chu, both of San Jose, Calif.

[73] Assignee: Intel Corporation, Santa Clara, Calif.

[21] Appl. No.: 35,630

[22] Filed: Mar. 24, 1993

[51] Int. Cl.⁶ .......................... G06F 12/00; G06F 13/00
[52] U.S. Cl. .................. 395/455; 395/445; 395/483; 395/471; 364/243.4; 364/243.41; 364/266.3; 364/271.5; 364/DIG. 1; 371/51.1; 371/62
[58] Field of Search ........................ 395/425, 445, 395/455, 471, 483; 364/243.4, 243.41, 266.3, 271.5; 371/37.6, 37.7, 40.4, 51.1, 61, 62

[56] References Cited

U.S. PATENT DOCUMENTS

| | | | |
|---|---|---|---|
| 3,789,204 | 1/1974 | Barlow | 371/51.1 |
| 4,151,593 | 4/1979 | Jenkins et al. | 395/425 |
| 4,483,003 | 11/1984 | Beal | 371/51.1 |
| 4,945,512 | 7/1990 | DeKarske et al. | 365/49 |
| 5,019,971 | 5/1991 | Lefsky et al. | 395/425 |
| 5,210,843 | 5/1993 | Ayers | 395/425 |
| 5,210,845 | 5/1993 | Crawford et al. | 395/425 |
| 5,307,477 | 4/1994 | Taylor et al. | 395/425 |
| 5,345,582 | 9/1994 | Tsuchiya | 395/575 |
| 5,353,424 | 10/1994 | Partovi et al. | 395/425 |
| 5,367,494 | 11/1994 | Shebanow et al. | 365/230.03 |

*Primary Examiner*—Eddie P. Chan
*Assistant Examiner*—Frank J. Asta
*Attorney, Agent, or Firm*—Blakely, Sokoloff, Taylor & Zafman

[57] ABSTRACT

A cache circuit for a computer microprocessor and a method for performing cache operations (e.g., read and write) in a single, short cycle using overlapped clocking. The cache includes a tag array, a status array, and a data array. Parity information is generated and checked to verify data and tag integrity. The parity field is stored in a status array physically separate from the tag array. The status array is offset in timing so that it lags behind the tag array for both read and write operations. Therefore, fields in the status array can be written in the early part of the next clock cycle without affecting the tag array or another operation that may be scheduled for the next time cycle.

14 Claims, 8 Drawing Sheets

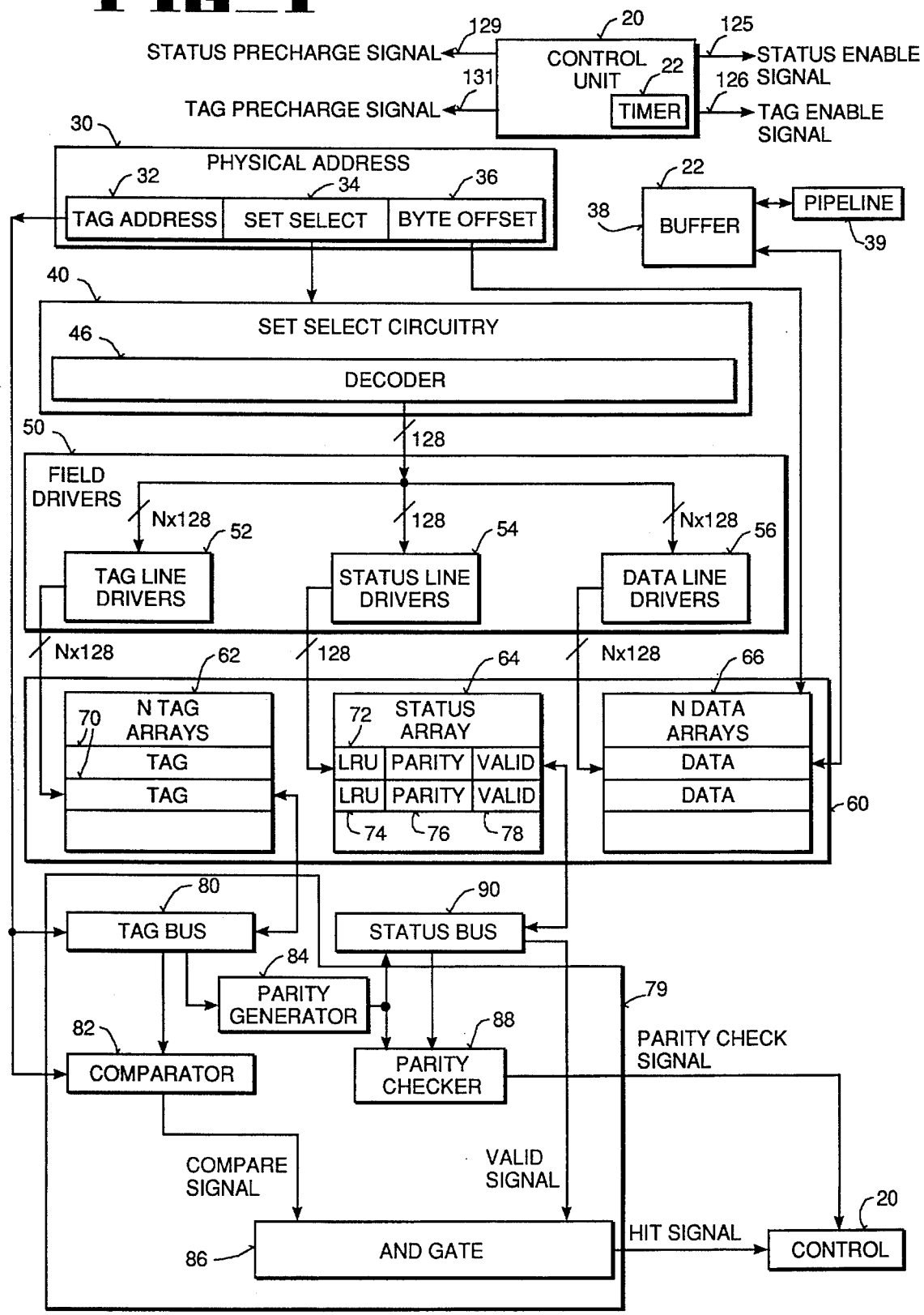

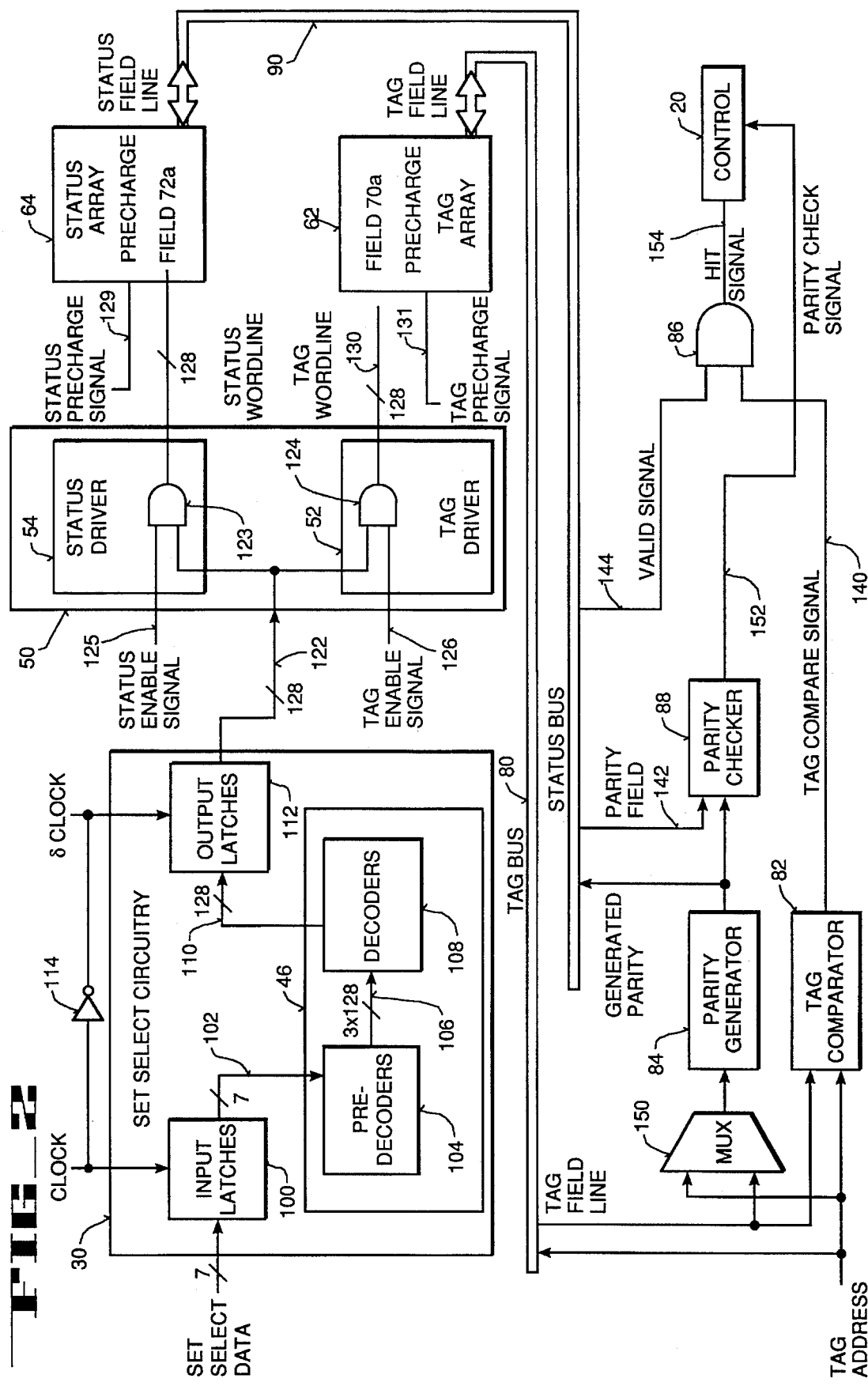

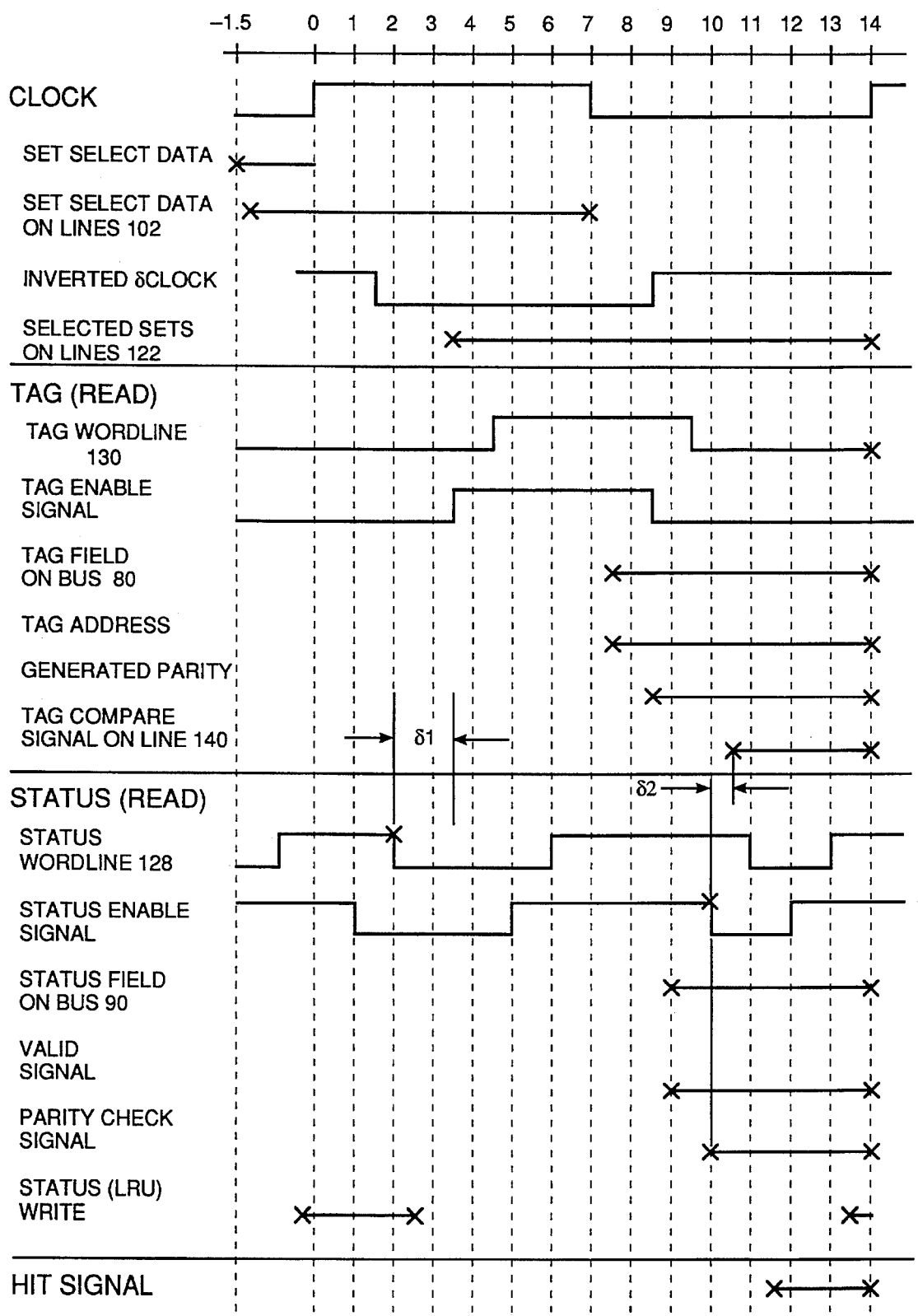

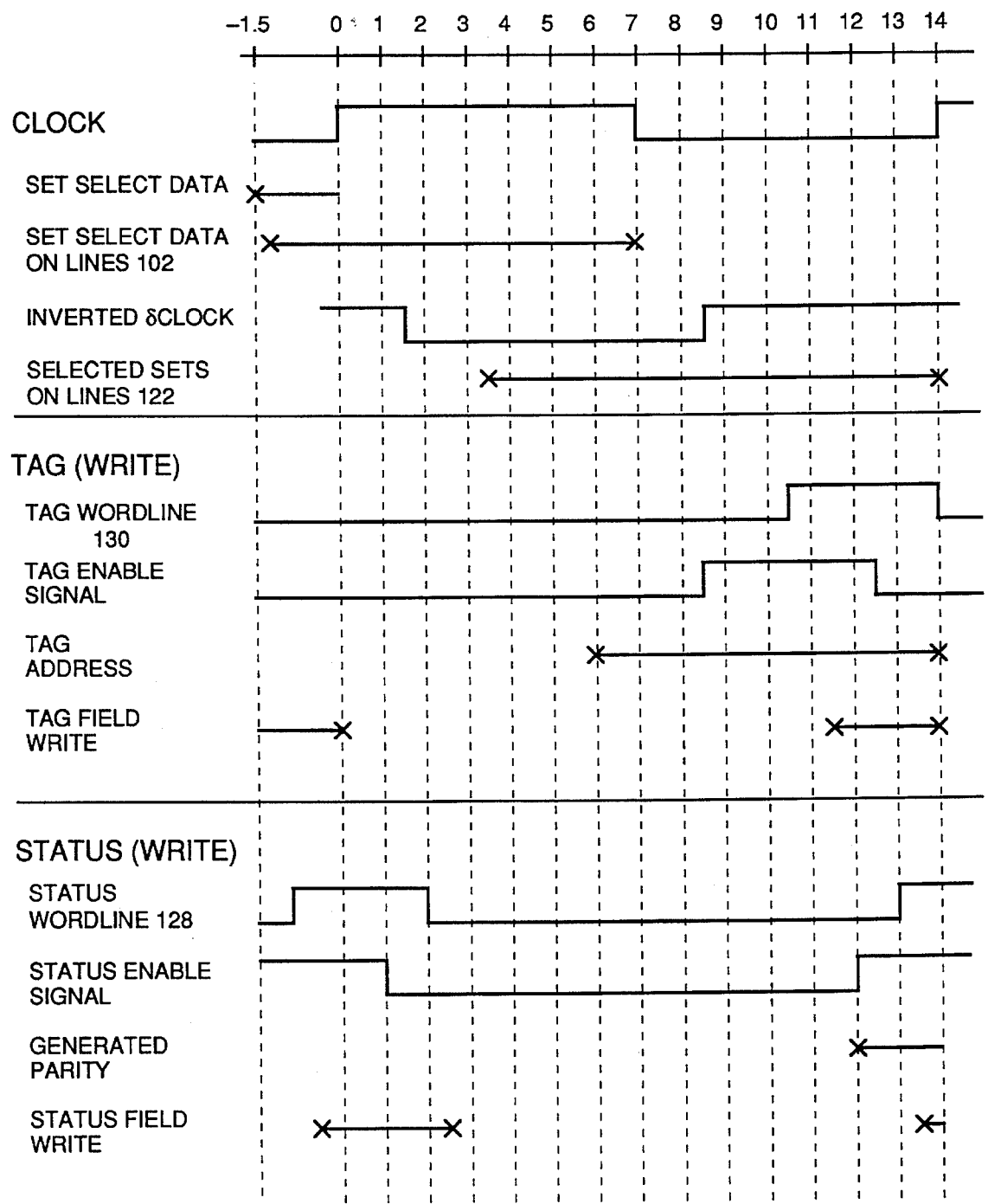

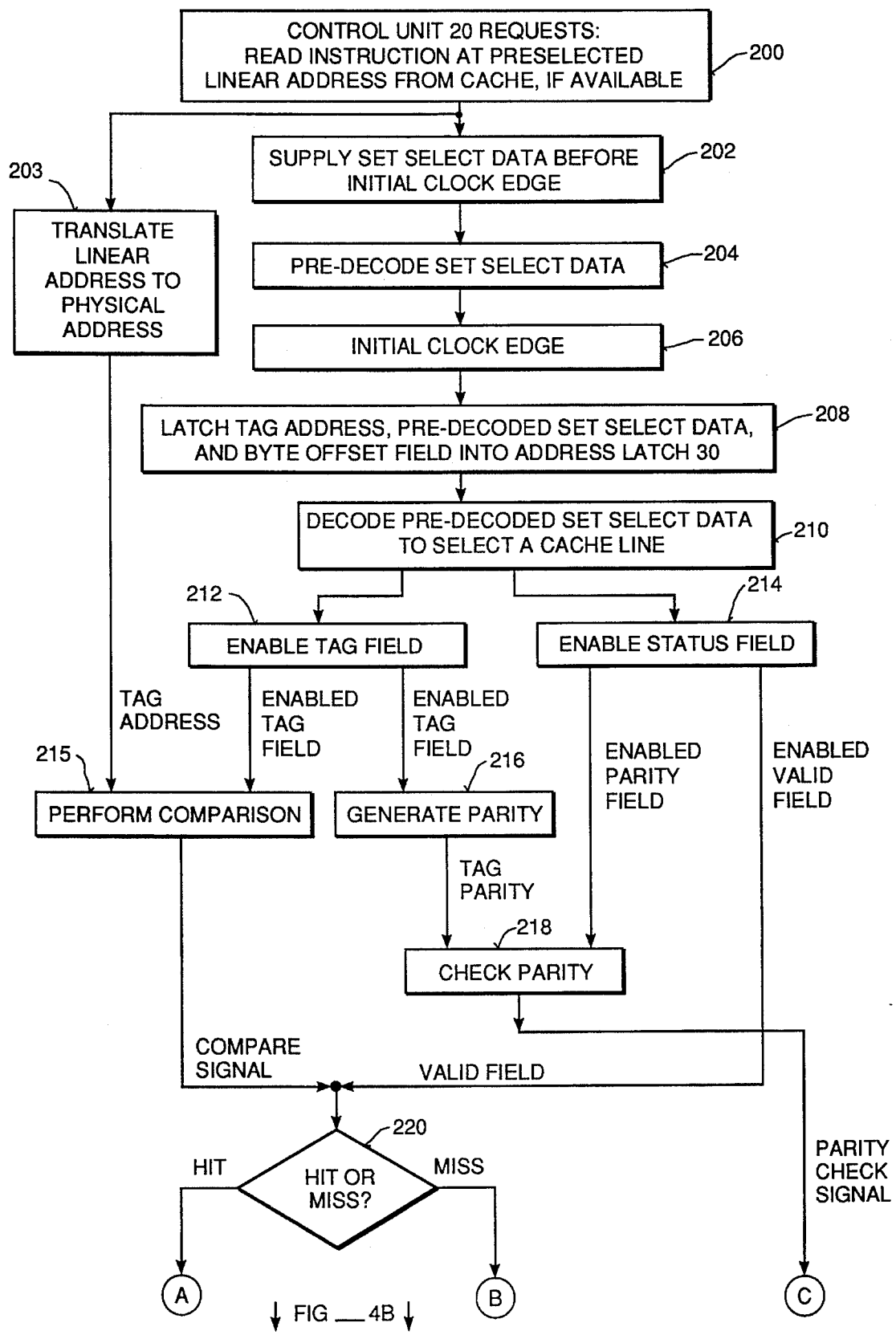

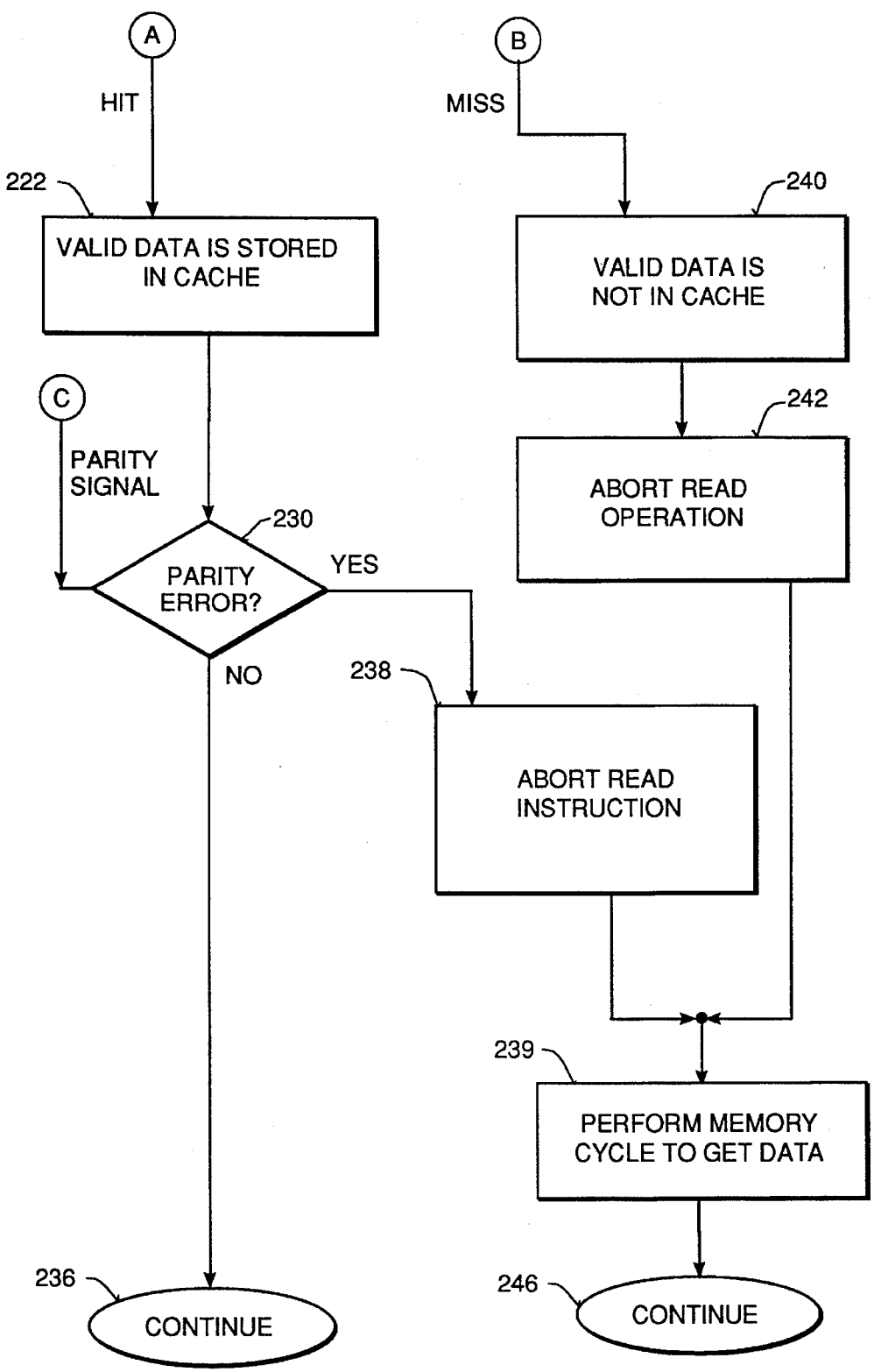
FIG_4B

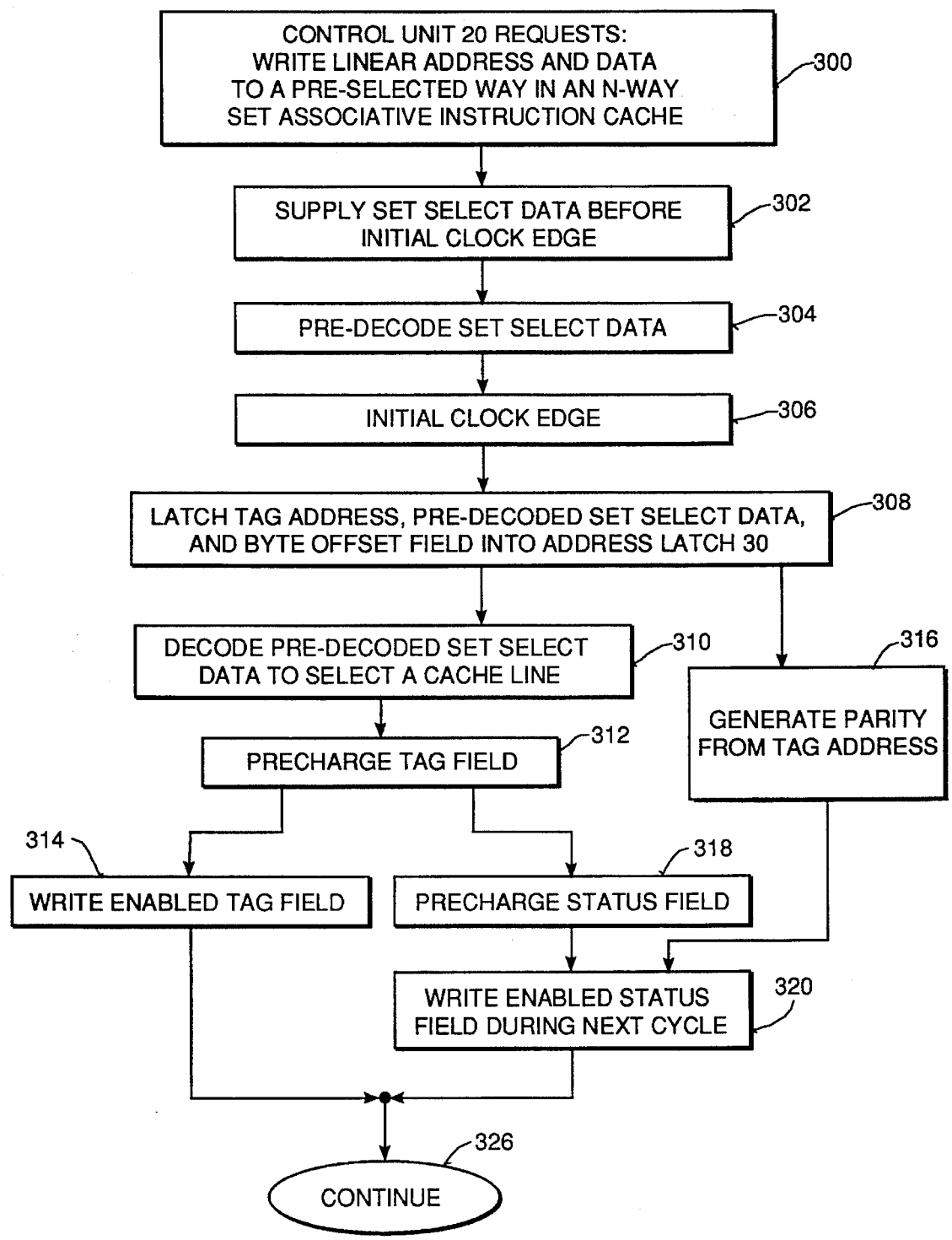

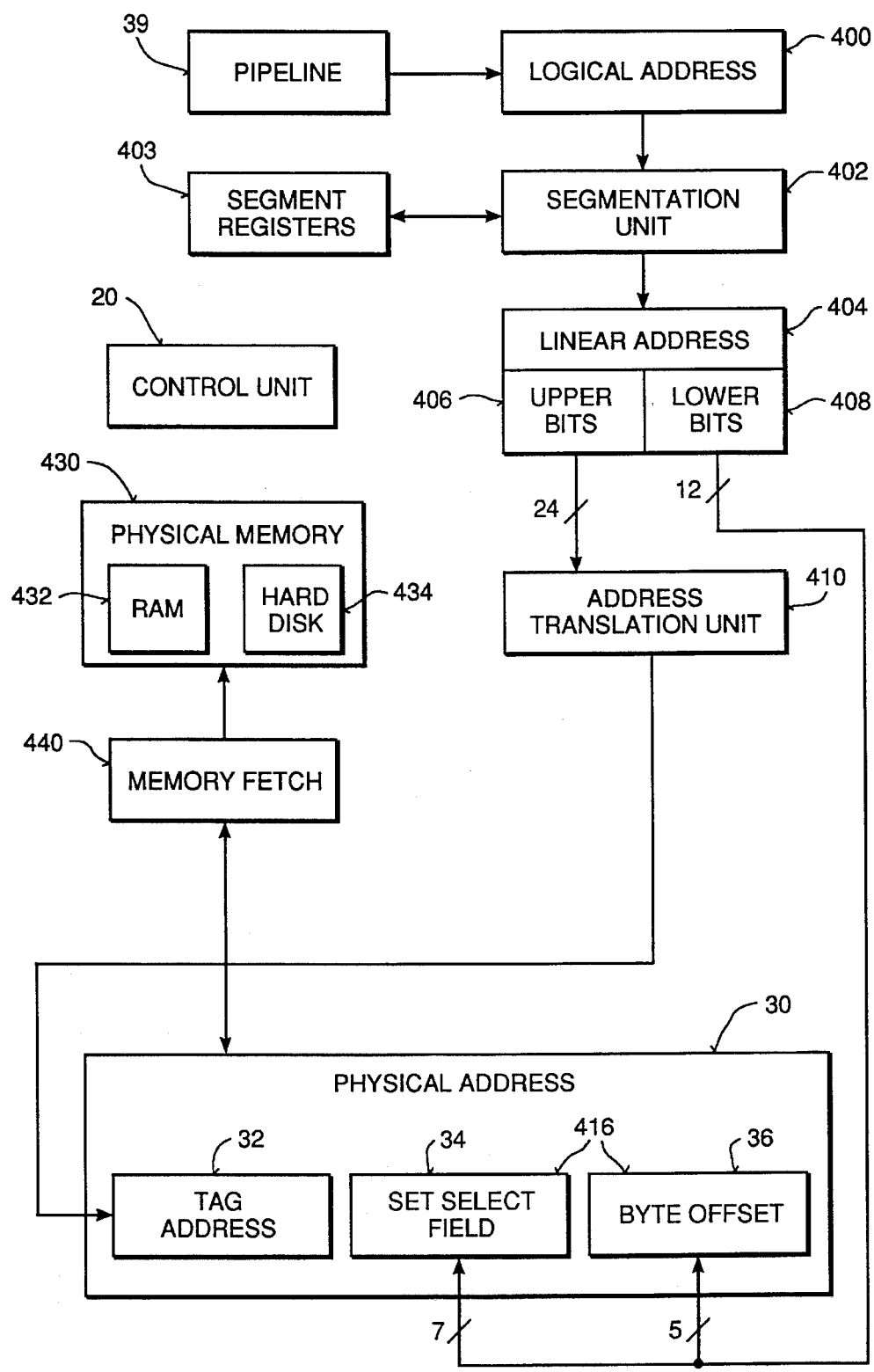
FIG_6

METHOD AND APPARATUS FOR OVERLAPPED TIMING OF CACHE OPERATIONS INCLUDING READING AND WRITING WITH PARITY CHECKING

BACKGROUND OF THE INVENTION

1. Field of the Invention

The present invention relates to caches in computer processors that have short cycles for faster performance. More specifically, the present invention relates to reading and writing a cache line in a computer processor and generating and checking parity to verify data integrity for the cache.

2. Description of Related Art

Computer processors are being designed and re-designed by research and development teams to process instructions faster. Computer processors perform tasks by executing a series of instructions that are supplied from a memory source. Thus, faster instruction processing generally means higher performance. Clock cycles are used to define boundaries for instruction execution. One way to increase performance is to reduce the period of each clock cycle so that the computer processes instructions at a higher rate of speed. However, shortening the clock period is not always achievable because limits imposed by microprocessor fabrication technology require a minimum time period for many operations. For example, 18 nanoseconds (ns) may be the minimum time necessary for the hardware to execute a common instruction for a given technology. If the clock period is shortened from 20 ns to 10 ns, then two clock cycles will be required to execute the 18 ns instruction instead of one, and no time savings will have been realized. Thus, reduction of the clock period is advantageous only if the instructions can fit within shorter time constraints.

Another way to increase performance is to reduce the number of clock cycles necessary to execute common computer operations. Memory accesses, which can consume three or more clock cycles, are common operations. In a memory access, an instruction may instruct the processor to read data from memory, or to store data in memory. If the processor executes instructions faster than it accesses memory, then memory access times could substantially delay computer operation, because often the processor must stall other operations while waiting to receive the data. Furthermore, because instructions are stored in memory, computer operation will be delayed if memory access times are longer than the average number of clocks per instruction. In order to reduce the time of memory access, a "cache" may be utilized to store and supply often used instructions and data. In most caches, one or two clock cycles is the maximum time necessary to retrieve data from a cache, in comparison to three or more cycles to retrieve data from memory. If the processor is faster than memory, for example if one instruction is executed per clock, substantial time savings and large increases in performance can result from use of a cache that can perform one cache access per clock.

Caches are organized in "lines". A cache may include hundreds of cache lines, each line including a selected block of memory which may be many bytes in length. There are many types of caches. In a fully associative cache, data can be stored in any cache line, regardless of its address. In a set associative cache, the cache lines are organized into "sets". Each set is assigned to hold data that has common lower address bits (the set address), and the cache lines in a particular set can hold data only if the lower bits match the set address. Because the set address uses the lower bits of an address, a long block of data can be stored in a series of sets. This is advantageous because data is usually read or written sequentially from a large block of memory. There are further advantages to a set associative cache. In a set associative cache, searching for a data match is simplified because the cache lines from only one set need be checked.

Each cache line is divided into fields that include a tag field indicative of the upper portion of address of the memory block, and a data field that stores the data at the memory location specified by the tag field. An exemplary address to access a cache includes a tag field indicative of the upper portion of address of the memory block, a set field indicative of the lower portion of the address, and a byte offset field to define the byte to be taken from the data. If a memory access occurs at a predetermined address, then the computer usually looks first to the cache to determine if a match (i.e., a "hit") can be found. If a hit occurs during execution of a read operation, then the data can be read from the cache line in the same cycle without the time-consuming memory access. During a write operation, the data is written to the cache line and the upper address is stored in the tag.

Often, it is desirable to verify the integrity of information stored in the cache, to guard against the small but distinct possibility that the stored data may have been altered in some way. Parity may be used for this purpose. The "parity" of computer data is defined by the number of set bits in a binary representation of the data. If the data has an even number of set bits, then an "even parity" results. But if the data has an odd number of set bits, then the data has an "odd parity". A "parity bit" is usually appended to the computer data to provide a preselected parity. For example, if the parity is predetermined to be "even" for each line of computer data in the cache, then the parity bit gives the data an even parity by either setting or clearing the parity bit according to the number of set bits in the data.

Parity checks are useful for both stored data (including instructions) and tags in a cache. If the stored data and tags are housed in separate arrays in the cache, then a location in the respective array is usually reserved for the parity bits, so that the data parity bit is stored together with the data in a data array, and the tag parity bit is stored together with the tag in a tag array. During a write to the cache, this configuration can slow cache operation because, although the data and the tag are available before the parity information, they cannot be written until after the parity information is calculated and becomes available. Parity information is not data, and provides no benefit other than data verification. It would be an advantage to provide a cache that allows immediate writing of the data and tag to its respective arrays, while still providing the advantages of parity verification.

It is advantageous if only one cycle is consumed by cache operations including a read and a write, and the associated parity checking. This is particularly advantageous if the processor speed is one clock per instruction. It would be advantageous to provide a cache and a method for performing cache operations that requires only one clock cycle per cache operation, and yet fits within the constraints of a short clock cycle of high speed computer processors.

SUMMARY OF THE INVENTION

The present invention provides a cache circuit for a computer and a method for performing cache operations (e.g., read and write) in a single, short cycle. The cache includes a tag array, a status array, and a data array. Parity information is generated and checked to verify data and tag integrity. The parity field is stored in a status array physically separate from the tag array. The status array is offset in timing so that it lags behind the tag array for both read and write operations. Therefore, fields in the status array can be written in the early part of the next clock cycle without affecting the tag array or another operation that may be scheduled for the next time cycle. Particularly, the cache circuit provides overlapping writing of a first cache instruction in a first cycle with a second cache instruction in a second cycle immediately following the first cycle. An advantage of this arrangement is that the integrity of data in the cache is verified by parity checking with virtually no time penalty, because data processing is separated from verification of the data.

The cache circuit includes a physical address means for providing a physical address having a plurality of fields including a tag address field, a byte offset field, and a set select field including set select data for selecting a cache line. Also included is a set associative cache having a plurality of sets, each of which has one or more cache lines for storing computer data, each cache line associating a tag field, a status field, and a data field. The set associative cache includes a data array for storing a plurality of data fields, a tag array for storing a plurality of tag fields, and a status array for storing a plurality of status fields. Each status field includes a tag parity field indicative of the parity of the tag and a valid field indicative of the validity of the data. A decoder is coupled to the physical address means for decoding set select data of a physical address to select a set. A control means provides a tag enable signal and a status enable signal delayed in timing from said tag enable signal. A tag driver is coupled to the decoder, responsive to said selected cache line and the tag enable signal, for enabling a tag field in the tag array, and a status driver is coupled to the decoder, responsive to said defined set and the status enable signal, for enabling a status field in the status array.

The method for writing a tag address and its associated parity information to a cache includes the steps of supplying a physical address to be written. The physical address includes a tag address, a set select field including set select data, and a byte offset. The set select data is decoded to select a set, which includes one or more cache lines. A tag field associated with the selected cache line in the tag array is enabled. The tag address in the cache address latch is written to the selected tag field at the end of the main cycle or in the beginning of the next main cycle. Subsequently to enabling a tag field, a status field associated with the selected cache line in the status array is enabled. A parity bit is generated that is indicative of the parity of said tag address. The parity bit is written to the selected parity field in an operation that continues through the end of the main cycle and continues into the beginning of the next main cycle.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and therefore resort to the claims is necessary to determine the inventive subject matter.

BRIEF DESCRIPTION OF THE DRAWINGS

FIG. 1 is a block diagram of a cache and cache circuitry in one preferred embodiment.

FIG. 2 is a diagram of cache and cache circuitry of FIG. 1, illustrating the signals flowing between the circuit elements.

FIGS. 3A and 3B are a timing diagram illustrating timing of the signals in a preferred embodiment, including overlapped timing.

FIGS. 4A and 4B are flow charts illustrating cache read operations.

FIG. 5 is a flow chart illustrating cache write operations.

FIG. 6 is a block diagram of an addressing system for providing a physical address.

DETAILED DESCRIPTION OF THE PREFERRED EMBODIMENT

FIGS. 1 through 6 of the drawings disclose various embodiments of the present invention for purposes of illustration only. One skilled in the art will readily recognize from the following discussion that alternative embodiments of the structures and methods illustrated herein may be employed without departing from the principles of the invention.

The preferred embodiment includes a two-way set associative cache that has 128 sets for storing data blocks. Having two ways, each set has two cache lines, one for each data block. However, the invention has application in any N-way set associative cache: the number of "ways" and the number of "sets" is not crucial to the invention. The number "N" can even be one. In an N-way set associative cache, each cache set is divided into N cache lines. For purposes of the following description, the term "data" will be used in its usual sense to include any binary representation, including instructions. When a cache line is to be stored, the data is first mapped onto a set, and then the data is placed in a block within the set. In the preferred embodiment, the two-way set associative cache has 128 cache sets (256 lines) for storing instructions. The 2-way set associative cache defines a block of data (the "data field") as 32 bytes. Data at a given memory address can be stored in only one of the 128 cache sets, but that data may be stored in either of the two "ways". The "way" in which the data is to be stored is preselected by a control unit.

Reference is first made to FIG. 1 which is a block diagram of a cache and associated circuitry incorporating the present invention. A control unit 20 controls operations to be described, including memory fetch operations and generation of a physical address. The control unit 20 also controls operations within the cache. Particularly, a timer 22 illustrated within the control unit 20 provides timing signals that will be described in detail with reference to FIGS. 2, 3A, and 3B. These signals supplied by the timer 22 include a tag enable signal, a status enable signal, a tag precharge signal, and a status precharge signal. The two tag signals are offset from the two status signals. Particularly, the status signals are delayed from the tag signals, as will be described later in more detail.

A physical address is illustrated in a box 30. Generation of the physical address in the preferred embodiment is described later in more detail with reference to FIG. 6. The physical address 30 is divided into a plurality of fields including a tag address field 32, a set select field 34, and a byte offset field 36. The tag address field 32 stores a tag address indicative of the upper bits of the physical address, the set select field 34 stores set select data indicative of a set in the cache, and the byte offset field 36 stores a byte offset indicative of the number of bytes to be offset in the cache line. Particularly, in the cache to be described, the preferred embodiment stores thirty-two bytes in a line, and thus the byte offset is utilized to specify which of the thirty-two bytes in the cache line are to be applied to a buffer 38. The data in the buffer 38 is then utilized in any appropriate manner. In the preferred embodiment, the data is an instruction which is to be executed in a pipeline 39.

The set select data from the physical address 30 is applied to set select circuitry 40 which will be described in more detail with reference to FIG. 2. The set select circuitry 40 includes a decoder 46 that selects one of the 128 sets in the cache. Each set has a number of cache lines defined by N, which is two in the preferred embodiment. The selected set from the decoder 46 is applied to field drivers 50 including N×128 tag drivers 52, 128 status drivers 54, and N×128 data drivers 56. The circuitry for the drivers 50 is also discussed in more detail with reference to FIG. 2. Each of the field drivers 50 is associated with one entry in a cache 60. The cache 60 in the preferred embodiment includes two tag arrays 62, one status array 64 and two data arrays 66. Each field in the arrays 62,64,66 is enabled by selecting one of the field drivers 50. A cache line includes all information associated with one block of data, and is defined to span each of the arrays 62, 64, 66 in the cache 60.

The tag array 62 includes a plurality of tag fields 70 which can be enabled by one of the tag drivers 52. A tag field 70 is associated with each of the 128 cache lines. The status array 64 includes a plurality of status fields 72, one for each of the 128 cache lines, which are enabled by one of the status drivers 54. The status array field 72 includes an LRU field 74, a parity field 76 and a valid field 78. The LRU field means "least recently used" and is used by the control unit 26 for determining which cache entry will be replaced on a write. A parity field 76 specifies the parity of the tag fields 70. The valid field 78 specifies whether or not a particular cache line is valid.

Cache processing circuitry 79 includes circuitry for comparing tags, verifying parity of the tags, verifying the validity of the cache lines, and buses for communicating the fields in the status array 64 and the tag arrays 62. The following discussion describes operation for one of the ways. For each of the N tag arrays 62, the cache processing circuitry 79 includes a duplicate circuit 79. Therefore, in the preferred embodiment which has two ways, the boxes shown within the cache processing circuitry 79 are duplicated. A different tag array 62 is used for each way, so that the number of tag arrays 62 is equal to the number of ways. However, only one status array 64 is used to store status information for all ways.

Each tag field 70 within the tag array 62 is accessed through a tag bus 80. The tag bus 80 is connected to supply an enabled tag field 70 to a comparator 82 and a parity generator 84. The tag bus 80 is also connected to receive the tag address from the physical address 30 on a write. The comparator 82 receives one input from the enabled tag field 70 on the tag bus 80 and another input from the tag address. The output from the comparator 82, a compare signal, is supplied to an AND gate 86. The parity generator 84 is connected to supply its output to a parity checker 88 and a status bus 90. The status bus 90 supplies an enabled status field 72, including a parity field 76, from the status array 64 to the parity checker 88. Furthermore, the parity generator 84 supplies a generated parity to the status bus 90 on a write so that parity can be written to the status array 64. The parity checker 88 supplies a parity check signal to the control 20, where it is used as described further with reference to FIG. 4.

The status bus 90 is also used to read or write a valid bit 78 and an LRU field 74. The valid field 78 can be directly used for a valid signal to the AND gate 86. For example, the valid bit 78 may be a "1" and therefore signify that the line is valid, otherwise, if the valid bit 78 is "0", it denotes that the line is not valid. The valid signal and the compare signal are applied to the AND gate 86, so that if the data is valid and the results of the comparison are correct, then a hit signal is provided to the control 20.

Reference is now made to FIG. 2 which is a schematic diagram illustrating the circuitry associated with reading and writing a cache line. FIGS. 3A and 3B are timing diagrams that illustrate reading and writing a line to the status array 64 and the tag array 62. Circuitry for the data array 66 is similar to that of the tag array 62. The schematic diagram of FIG. 2 is particularly useful in conjunction with the timing diagrams of FIGS. 3A and 3B.

Reference is therefore made to FIGS. 2, 3A, and 3B. A clock cycle is defined along the top of FIGS. 3A and 3B. The cycle is divided into fourteen intervals, each representing one nanosecond (ns). Timing details are provided herein to describe the preferred embodiment of the invention. It should be noted that some of the specified times are approximations.

Beginning at the time −1.5 ns (before the beginning of a cycle), set select data from the set select field 34 is supplied to input latches 100 in the set select circuitry 40. Because the set select data has seven bits, there are seven input latches 100. The input latches 100 are each latched by a main clock signal, however, the input latches 100 are "transparent" when the clock is low. When the input latches 100 are transparent, the set select data appearing at the input passes through the latches 100 with a very short delay. When the clock goes high, then the set select data is latched into those latches 100 and remains latched until the main clock cycle again drops low. FIG. 3A shows a timing line indicating availability of the set select data to the decoder 46, which includes a plurality of predecoders and decoders to be described.

The output of the input latches 100 include seven lines 102 that are supplied to predecoders 104. There are a number of predecoders, each of which receives one or more of the seven lines 102. The outputs from the predecoders 104 are supplied on lines 106 to the decoders 108. The lines 106 include 128 sets of three lines each. These 128 sets are supplied to decoders 108, which in the preferred embodiment include three-input AND gates. The 128 outputs of the decoders 108 are supplied on set lines 110 to output latches 112. Each output latch 112 receives and latches one of the set lines 110. The output latches 112 are clocked by a delayed and inverted clock signal. A suitable delay is provided by an inverter element 114 that delays and also inverts the main clock signal. The output latches 112 are transparent while the inverted delayed clock signal is low. When the inverted delayed clock signal becomes high, data on the set lines 110 is latched in, and remains latched in while the inverted delayed clock signal remains high.

During operation, shortly after initial clock edge of the main clock cycle in which the set select data is clocked into the input latches 100, the inverted delayed clock signal becomes low (and therefore the output latches 112 become transparent). Thereafter, the decoded set select data becomes available on the set lines 110 and then the selected set will pass through the output latches 100. This is illustrated in FIG. 3A as occurring at approximately 3.5 ns. Subsequently at 8.5 ns, during the second half of the main clock cycle, the inverted delayed clock signal becomes high and therefore latches the selected set. The selected set remains latched beyond the end of the second half of the main clock cycle for a period determined by the clock delay which is illustrated as 1.5 ns. This delayed and inverted latching mechanism, which provides continued set selection beyond the end of the main clock cycle, has an advantage in that data can be written to one of the arrays 60 even after the end of the main clock cycle.

The output latches 112 supply the selected set on select lines 122. Each select line 122 is connected to one of a plurality of field drivers 50. For purposes of illustration, only a single status driver 54a and a single tag driver 52a are shown. It should be remembered that there is one driver 52,54 for each field in the cache 60 and therefore the number of drivers 52,54 equals the number of fields in the cache 60. One of the select lines 122 is connected to the status driver 54a and the tag driver 52a. Furthermore, this select line 122 may also be connected to (see FIG. 1) a data driver 56. Specifically, the select line 122a is supplied to an AND gate 123 within the status driver 54a and an AND gate 124 within the tag driver 52a. A status enable signal from the timer 22 in the control unit 20 (FIG. 1) is supplied to an enable status line 125 which is connected to the other input of the AND gate 123. A tag enable signal from the timer 22 in the control unit 20 (FIG. 1) is supplied to an enable tag line 126 which is connected to another input of the AND gate 124. Thus, the enable signals on the enable status line 125 and the enable tag line 126 control the timing of enabling of the respective arrays 62, 64, as will be described in more detail subsequently, for example in the timing diagrams of FIGS. 3A and 3B.

A status word line 128 connects the output of the AND gate 103 to enable a specific field 72a in the status array 64. The status array 64 receives a status precharge signal on a line 129. The status precharge signal is timed to provide a high output which precharges the field 72a in the status array 64 before the status enable signal enables a status word line 128. Similarly, a tag word line 130 is connected to the line 102 from the decoder 50, to enable a field 70a in the tag array 62. The tag array 62 receives a tag precharge signal on a line 131. The tag precharge signal is timed to precharge the field 70a in the tag array 62 before the tag enable signal enables the tag word line 130. The output signals from the latches 112 on the lines 122 are illustrated in FIG. 3A beginning approximately at 1.5 nanoseconds after the beginning of the cycle.

FIG. 3A illustrates timing during a read operation and FIG. 3B illustrates timing during a write operation. Reads and writes are the two basic operations described herein. Read-modify-write instructions may be implemented as a combination of reading and writing. Beginning with FIG. 3A, it can be seen that, during a read, the enable tag line 126 is brought high at approximately 3.5 ns, and continues to be high until approximately 8.5 ns. The selected tag word line 130 is high at 4.5 ns, and continues to be high until about 9.5 ns. As a result, at approximately 7.5 ns, the tag field 70a from the tag array 62 is enabled on the tag bus 80. This enabled tag field 70a is latched into a latch (not shown) connected to the output of the tag array 62 to hold the enabled tag field 70a for the remainder of the cycle, as illustrated in FIG. 3A. At 7.5 ns, the enabled tag field 70a is supplied on the tag bus 80 to the tag comparator 82, and the tag address is also supplied to the tag comparator 82. The tag address requires translation in addition to the set select data, therefore there is a time delay between when the set select data is available and when the tag address is available. Beginning at 10.5 ns, a tag compare signal is supplied on an output line 140 from the tag comparator 82. The tag compare signal on line 140 is supplied to the AND gate 86.

Referring now to timing of the status array 64, there is a delay in timing of the enable status line 125 and the status word line 128 by approximately 1.5 ns ($\delta 1$ in FIG. 3A) with respect to the enable tag line 126 and the tag word line 130. The enable status line 125 is high at approximately 5.0 ns and continues for approximately 5.0 ns until 10.0 ns. The status word line 128 is high at about 6.0 ns to begin enabling the status field 72a. The enabled status field 72a is available at approximately 9.0 ns, and is supplied to the status bus 90. The parity field 76 (FIG. 1) is supplied on a line 142 to the parity checker 148, and the valid signal is taken directly from the valid bit in the status array 64. The valid signal is provided on a line 144 to the AND gate 86 and is available at approximately 9.0 ns, the same as the status field of which it is a part.

The inputs to the AND gate 86 include the valid signal on the line 144 and the tag compare signal on the line 140. If these signals indicate that the data is valid and the comparison has found a match, then at approximately 11.5 ns, a hit signal on the line 154 will be supplied to the control 20.

As discussed above, the enabled tag field is supplied on the tag bus 80 to the tag comparator 82. During a read, the tag field is also applied to the parity generator 84 through a MUX 150 in order to generate the parity of the enabled tag field. The enabled tag field is supplied at 7.5 ns and at approximately 9.0 ns the generated parity is supplied to the parity checker 88 in which it is compared with the enabled parity field arriving on the line 142. At approximately 10.0 ns, the parity check signal is supplied on a line 152 to the control 20.

Reference is now made to FIG. 3B, which illustrates timing for a write operation, the second of the two operations described herein. The timing of the enable status line 125 and the status word line 128 during a write is the same as that for a read. However, in a write, the tag address is supplied through the MUX 150 to the parity generator 84. The generated parity is supplied to the status bus 90 and then eventually written to the status array 64. As illustrated in FIG. 3B, the generated parity signal is available at about 12.0 ns. Subsequently, beginning just before the end of the cycle, at 13.5 ns, the status field is written from the status bus 90 to the status array 64. Writing the status field continues through about 2.5 ns of the next cycle. Even though writing the status field continues through the beginning of the next cycle, operation of the next instruction is not affected because the status field is not needed until about 3.5 ns.

On a write, the enable tag line 125 does not become high until about 8.5 ns and continues for about 4.0 ns until 12.5 ns. The tag word line on the line 130 becomes high about 10.5 ns. As illustrated by a tag field write, the tag address is written at about 11.5 ns through the end of the cycle and possibly continuing over the end of the cycle into the beginning of the next cycle. Again, even though the writing overlaps into the next cycle, operation of the next instruction is not affected.

Reference is now made to FIGS. 4A, 4B, and 5. Specifically, a flow chart for a read instruction is illustrated in FIGS. 4A and 4B, and a flow chart for a write instruction is illustrated in FIG. 5. Initiation of the read or write sequence is controlled by the control unit 20. Such control is conventional and is not described in detail here. In FIG. 4A, a box 200 illustrates that the control unit 20 requests that an instruction be read at a preselected address from the cache 60, if that address is available in the cache 60. The preselected address is a linear address whose lower bits are identical with those of the physical address, but whose upper bits require translation. The lower bits are therefore applied directly to form the set select field. As illustrated in the box 202, the set select data is supplied before the initial clock edge. But the upper portion of the address is applied to a translation unit which, as illustrated in a box 203, translates the linear address to a physical address, and therefore supplies a tag address.

Subsequent to supplying the set select in the box 202, the box 204 illustrates that the set select data is predecoded in the predecoders 104 (FIG. 2). The box 206 illustrates the initial clock edge. In the box 208, the set select data is latched into the input latches 100 (FIG. 2) in the set select circuitry 40. Then, in a box 210, the predecoded set select data is fully decoded in the decoders 108 to select one of the lines in the cache 60. In a box 212 a tag field is enabled, and in the box 214 a status field is enabled.

Not shown is selection and enablement of the data field which parallels timing for the tag field. Subsequently, the enabled data field is supplied to the buffer 38 (FIG. 1). If it later turns out that a miss has occurred then the data in the buffer 38 is marked invalid or the pipeline 39 is flushed, depending upon where the miss is recognized by the control unit 20. Preferably, the miss is recognized soon enough that the buffer 38 can be marked invalid.

From the box 212, the enabled tag field is supplied to perform a comparison as illustrated in the box 215. The enabled tag field is also supplied to the box 216 in which parity is generated to supply a generated tag parity signal which in turn is supplied to a box 218 in which the generated parity is compared with the enabled parity field. Exiting from the box 218, a parity check signal is used as described with reference to "C" in FIG. 4B. Continuing in FIG. 4A, the result of the comparison from the box 215, the compare signal, is supplied to the decision 220. Also, the enabled valid field from the enabled status field in a box 214 is supplied to the decision 220. If the compare signal indicates a match, and if the valid signal indicates that the data is valid, then a hit will be found, and operation will proceed to "A" in FIG. 4B. However, if a miss is found, then operation will proceed to "B" in FIG. 4C.

Turning now to FIG. 4B, in the instance of a hit, operation proceeds from "A" to a box 222, which illustrates that valid data is stored in the cache. Next, a decision 230 branches dependent upon whether or not there was a parity error. The decision 230 receives the parity signal from "C" in FIG. 4A. If there is no parity error, then operation continues as illustrated in a box 236.

Proceeding from the decision 230, if there is a parity error then operation moves to a box 238 in which the read operation is aborted and the selected cache line is marked invalid. Subsequently, operation moves to a box 239 in which a memory cycle is performed to get data.

However, if there was a miss instead of a hit in the decision 220, then operation proceeds from "B" to a box 240 which illustrates that valid data is not in the cache 60. Therefore, the operation moves to a box 242 in which the read operation is aborted. Operation then proceeds to the box 239 in which a memory cycle is performed to get data. Subsequently operation continues as illustrated at 246. It should be remembered that the operation of the parity signal from "C" proceeds in parallel with the operations in lines "A" and "B". Therefore, these operations may be occurring simultaneously.

Reference is now made to FIG. 5, which is a flow chart illustrating operation during a write instruction. The box 300 illustrates initiation by the control unit 20. Specifically, the control unit 20 requests to write a physical address and data to a preselected way in an N-way set associative instruction cache. In the box 302, the set select field is applied before the initial clock edge, as in a read. Similarly, operation through the boxes 304, 306 and 308 parallels operation during a read. Then, the predecoded set select data is decoded in the box 310. Next, in the box 312, the selected tag field is precharged. Then, operation moves in parallel to a box 314 in which the tag field is written, to a box 316 in which parity is generated from the tag address, and to a box 318 to precharge the status field. Operation then moves to a box 320 in which the enabled status field is written during the next cycle. Operation then continues to a box 326.

Reference is made to FIG. 6 which shows circuitry for generating the physical address in the implemented embodiment, which includes segmentation and paging. The described arrangement for generating the physical address is conventional in INTEL x86 microprocessors. A logical address 400 is supplied from the pipeline 39. The logical address 400 is the address used by a programmer, which allows the programmer to view memory as one sequential block. The logical address 400 is applied to a segmentation unit 402, which takes the logical address 400, applies values in segment registers 403, and outputs a linear address 404 which has 24 upper bits 406 and 12 lower bits 408.

In order to translate a linear address 404 into the physical address 30, translation of the upper bits 406 of the linear address 404 occurs in an address translation unit 410. These translated upper bits become the tag address 32 of the physical address 30. Blocks of data are defined to be 4 Kbytes, therefore translation of the lower twelve bits 408 of the linear address 404 is unnecessary because they are identical with lower bits 416 of the physical address 30. Therefore, the lower twelve bits 408 can also be applied directly to the physical address 30 or to a memory fetch unit as appropriate.

The address translation unit 40 includes tables and circuitry for locating the physical address 30 from a linear address 404 and may include a TLB (Translation Look-aside Buffer). An exemplary address translation arrangement is disclosed in U.S. patent application Ser. No. 07/832944 by Donald B. Alpert et al., entitled "Physical Address Extension for a Microprocessor", the disclosure of which is incorporated by reference herein.

A physical memory 430 includes RAM (Random Access Memory) 432 and hard disk memory 434. Other types of memory may be used as well. In physical memory 430, data blocks are stored wherever convenient, and blocks having sequential linear addresses may physically be stored in any order. The physical address 30 directly corresponds to data location in the physical memory 430. In other words, the physical address 30 specifies the actual memory location in which the information is stored. The physical address 30 is applied to a memory fetch unit 440 that fetches data from physical memory 430. Conventionally, the RAM 432 is utilized to store information from the hard disk 434 before it is used by the processor. Thus, the memory fetch unit 440 first looks to the RAM 432 for data at a requested physical address. If data at that physical address is not in RAM 432, then a memory cycle is run to retrieve that data from the hard disk 434 and store it in RAM 432.

From the above description, it will be apparent that the invention disclosed herein provides a novel and advantageous cache and method for operating the cache. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. In a computer processor, a cache circuit for one-cycle operation of cache read and cache write instructions, said cache circuit allowing writing operations of a first one of said cache instructions in a first cycle supplied by a main clock signal to be overlapped with a second one of said cache instructions in a second cycle immediately following the first cycle, said cache circuit including:

a physical address means for providing a physical address having a plurality of fields including a tag address field, a byte offset field, and a set select field including set select data;

a set associative cache having a plurality of sets, each set including one or more cache lines for storing computer data, each cache line associating a tag field, a status field, and a data field, said cache including
a data array having a plurality of data fields,
a tag array having a plurality of tag fields, and
a status array having a plurality of status fields, each status field including a tag parity field indicative of the parity of the tag, and a valid field indicative of the validity of the data;

a set select circuit coupled to the physical address means for decoding set select data of a physical address to select a set of cache lines;

control means for providing a tag enable signal and also for providing a status enable signal delayed in timing from said tag enable signal;

a plurality of tag drivers coupled to the set select circuit, each tag driver responsive to said selected set of cache lines and the tag enable signal, for enabling a tag field in the tag array; and a plurality of status drivers coupled to the set select circuit, each status driver being responsive to said selected set of cache lines and the status enable signal, for enabling a status field in the status array.

2. The cache circuit of claim 1 wherein said set select circuit includes a decoder coupled to receive set select data from the physical address means and to select said set responsive thereto;

a set latch coupled to the decoder to latch the set selected by said decoder, said set latch having a plurality of outputs coupled to the plurality of tag drivers and status drivers for supplying said selected set to the drivers for that selected set, and a latch control circuit coupled to said set latch for latching said selected set in the first cycle, wherein said latch control circuit continuously controls latching by said set latch into said second cycle.

3. The cache circuit of claim 2 further comprising:

delayed clock means for delaying the main clock signal, said delayed clock means coupled to the set latch for supplying a delayed clock cycle thereto; and wherein said set latch is transparent during a first half of said delayed cycle so that the selected set is passed through to the status and tag drivers in said first half, and said set latch latches and holds the selected set during the second half of the delayed clock cycle.

4. The cache circuit of claim 1 further comprising, for each tag and status array:

a tag bus coupled to the tag fields of the tag array;

a status bus coupled to the status fields of the status array;

a comparator coupled to the tag bus and the physical address means, said comparator for comparing an enabled tag field provided on the tag bus with a tag address provided by said physical address means; and a parity generator circuit, coupled to the tag bus, for generating a generated parity from said enabled tag field.

5. The cache circuit of claim 4 further comprising:

parity checking means, coupled to the status bus, for comparing the generated parity with the enabled parity field.

6. The cache circuit of claim 5 further comprising:

a compare signal output from said comparison circuit indicative of a match between the enabled tag field and the tag address;

a valid signal provided on said status bus responsive to the valid field in an enabled status field; and a gate, responsive to said compare signal and said valid signal, for providing a hit signal if said compare signal indicates a match and the valid signal indicates that the data field associated with said enabled status field line is valid.

7. The cache circuit of claim 6 further comprising:

a parity signal output from the parity checking means indicative of a result of comparing the generated parity with the enabled parity field; and a control means, responsive to the hit signal and the enabled parity signal, for preventing use of data from the selected cache line if there is not a hit or if parity is incorrect, otherwise allowing use of the data.

8. In a computer processor whose operations are defined by a series of clock cycles, a method of writing a tag address and its associated parity information to a cache having a tag array, a status array, and a data array, said cache having a plurality of cache lines for storing computer data, each cache line associating a data field in a data array with a tag field in the tag array, and a status field including a tag parity field in the status array, said method comprising the steps of:

(a) supplying a decoder with a physical address to be written, including a tag address, a set select field including set select data, and a byte offset;

(b) decoding said set select data to select a cache line;

(c) enabling a tag field associated with the selected cache line in the tag array;

(d) writing said tag address to said enabled tag field;

(e) generating a parity bit indicative of the parity of said tag address;

(f) subsequently to said step (c), enabling a status field associated with the selected cache line in the status array; and (g) writing the parity bit generated in said step (e) to the parity field in said enabled status field.

9. The method of claim 8 wherein the series of cycles defining computer operation include a first cycle and a second cycle, the steps (a) through (c) are completed in the first cycle, and the steps (d) through (g) are completed in the second cycle.

10. The method of claim 8 wherein the cycles defining computer operation include a first cycle and a second cycle, the steps (a) through (e) are completed in the first cycle, and the steps (f) and (g) are completed in the second cycle.

11. The method of claim 10 including, following completion of step (d) in the first cycle, the steps of:

(h) supplying a second physical address including a second tag address, a second set select field, and a second byte offset; and (i) decoding said second set select field in the second cycle to select a second cache line, said decoding of said second set select field occurring simultaneously with said step (g).

12. The method of claim 11, further including steps for reading data previously written to said second cache line, including:

(j) enabling the previously written second cache line in the tag array to select a second tag field;

(k) comparing said second tag field with said second tag address, and outputting a compare signal indicative of the results of said comparison;

(l) generating a second generated parity from said second tag field;

(m) enabling the second cache line in the status array to select a second status field including a second parity field;

(n) comparing the second parity field with said second generated parity to output a parity check signal indicative of the results of said comparison; and (o) if said compare signal indicates that the second tag field matches said second tag address, and if said parity check signal indicates that the second parity field matches said generated parity, then supplying a hit signal to indicate the validity of the data field of said second cache line.

13. The method of claim 10 wherein operation of the steps (f) and (g) begins in the first cycle and is completed in the second cycle.

14. In a computer processor for executing instructions timed with a series of clock cycles, a method for accessing a cache line for reading or writing, and calculating and checking the parity of tag data in the cache line, so that a read instruction or a write instruction can be performed each cycle, said method comprising the steps of:

(a) supplying a first clock cycle and a second clock cycle next following the first clock cycle;

(b) supplying a physical address including a tag address and a set select field;

(c) if a read is requested, then in the first clock cycle executing the steps of (c)(1) selecting a first cache line, (c)(2) enabling a tag field of said first cache line, (c)(3) reading a tag from said enabled tag field, (c)(4) comparing the enabled tag field with the physical address to determine if there is a match, (c)(5) if a match is determined in step (c)(4), then supplying a tag match signal, first signal, and otherwise, supplying a second signal, (c)(6) checking the parity of the enabled tag field by generating a parity of the enabled tag field and comparing it with a predetermined parity stored in a status field of said first cache line, (c)(7) if the generated parity of said enabled tag field matches said predetermined parity, then supplying a parity match signal, (c)(8) determining a hit only if both the tag match signal and the priority match signal are provided, otherwise determining a miss, (d) if a write is requested by an instruction, then (d)(1) in the first· clock cycle executing the steps of supplying a physical address including a tag address that selects a second cache line to be written to, and writing the tag address to the second cache line, (d)(2) in the first clock cycle and continuing into the second clock cycle, calculating the parity of the tag address to supply parity data and storing said parity data in said second cache line.

* * * * *